United States Patent
Sevindik

(10) Patent No.: US 9,553,735 B1
(45) Date of Patent: Jan. 24, 2017

(54) SYSTEMS AND METHODS FOR DETERMINING BROADCAST PARAMETERS FOR A TRANSMISSION

(71) Applicant: Sprint Spectrum LP, Overland Park, KS (US)

(72) Inventor: Volkan Sevindik, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 7 days.

(21) Appl. No.: 14/448,125

(22) Filed: Jul. 31, 2014

(51) Int. Cl.
*H04H 40/00* (2009.01)
*H04L 12/18* (2006.01)
*H04W 72/00* (2009.01)

(52) U.S. Cl.
CPC ........ *H04L 12/1881* (2013.01); *H04W 72/005* (2013.01)

(58) Field of Classification Search
CPC . H04W 48/20; H04L 41/5051; H04L 41/0896; H04L 65/4076; H04L 65/4084; H04H 2201/37; H04J 3/1694
USPC ............................................. 455/3.06, 412.2
See application file for complete search history.

(56) References Cited

U.S. PATENT DOCUMENTS

| | | | |
|---|---|---|---|
| 2009/0168752 A1* | 7/2009 | Segel | H04N 7/17309 370/351 |
| 2012/0269110 A1 | 10/2012 | Walker et al. | |
| 2013/0229979 A1* | 9/2013 | Liu | H04L 1/1893 370/328 |
| 2015/0067754 A1* | 3/2015 | Wiser | H04N 21/2668 725/120 |

* cited by examiner

*Primary Examiner* — Tu X Nguyen

(57) ABSTRACT

Systems and methods are described for determining broadcast parameters for a transmission. A plurality of broadcast content that comprise a priority level may be received, where each of the plurality of broadcast content may also comprise a timing for broadcasting. For each of the plurality of broadcast content, a number of nodes for broadcasting may be determined based on the priority level and the timing for broadcasting. The plurality of broadcast content may also be ranked based on the timing for broadcasting and the number of nodes for broadcasting. At least one scheduler may be instructed to schedule the plurality of content for broadcasting based on the ranking and the priority level for each of the plurality of broadcast content.

20 Claims, 7 Drawing Sheets

SYSTEMS AND METHODS FOR DETERMINING BROADCAST PARAMETERS FOR A TRANSMISSION

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a broadcast transmission may be leveraged to reach a plurality of wireless devices. For example, where a number of wireless devices request or subscribe to a transmission, the transmission may be broadcasted to conserve system resources. Here, determining broadcast parameters for the transmission may enhance the user experience for the wireless devices that receive the broadcast.

OVERVIEW

Systems and methods are described for determining broadcast parameters for a transmission. A plurality of broadcast content that comprise a priority level may be received, where each of the plurality of broadcast content may also comprise a timing for broadcasting. For each of the plurality of broadcast content, a number of nodes for broadcasting may be determined based on the priority level and the timing for broadcasting. The plurality of broadcast content may also be ranked based on the timing for broadcasting and the number of nodes for broadcasting. At least one scheduler may be instructed to schedule the plurality of content for broadcasting based on the ranking and the priority level for each of the plurality of broadcast content.

DETAILED DESCRIPTION

Figure 1:
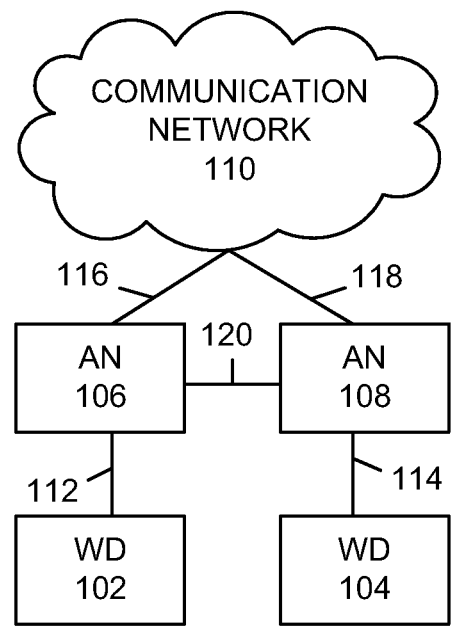
FIG. 1 illustrates an exemplary communication system to determine a transmission scheme for a broadcast.

FIG. 1 illustrates an exemplary communication system 100 to determine broadcast parameters for a transmission comprising wireless devices 102 and 104, access nodes 106 and 108, communication network 110, and communication links 112, 114, 116, 118, and 120. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 106 and 108, and communication network 110 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 106 and 108, any number of wireless devices can be implemented.

Access nodes 106 and 108 are network nodes capable of providing wireless communications to wireless devices 102 and 104, and can be, for example, a base transceiver station, a radio base station, or an eNodeB device. Access nodes 106 and 108 may communicate with communication network 110 over communication links 116 and 118 respectively. Access nodes 106 and 108 may also communicate directly with each other over communication link 120.

Although only access nodes 106 and 108 are illustrated in FIG. 1, wireless devices 102 and 104 can be in communication with a plurality of access nodes and/or relay nodes. The plurality of access nodes and/or relay nodes can be associated with different networks and can support different communication protocols and radio access technologies.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof.

Communication links 112, 114, 116, 118, and 120 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
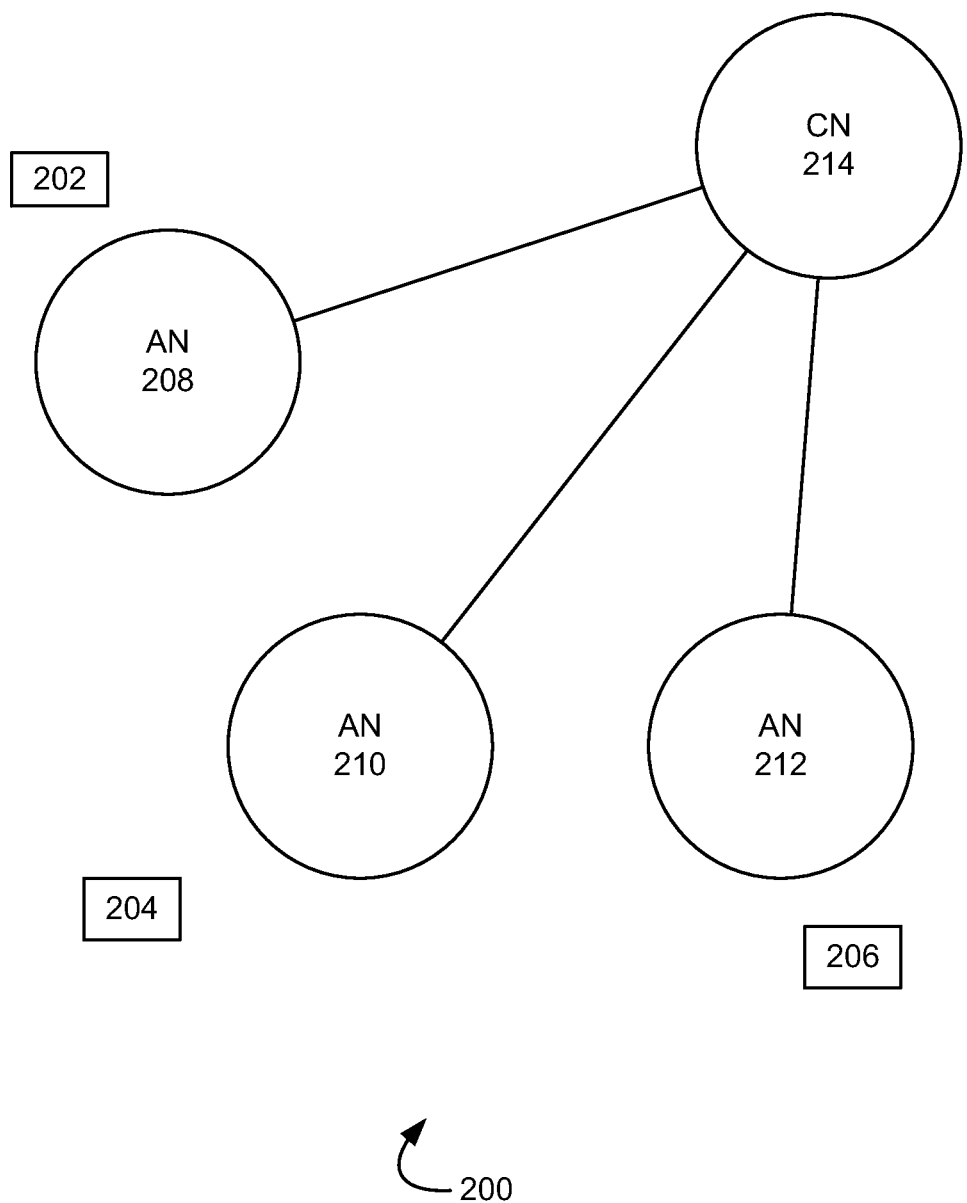
FIG. 2 illustrates another exemplary system to determine a transmission scheme for a broadcast.

FIG. 2 illustrates an exemplary communication system 200 for determining broadcast parameters for a transmission. System 200 comprises wireless devices 202, 204, and 206, access nodes 208, 210, and 212, and controller node 214. Wireless devices 202, 204 and 206 may comprise devices similar to wireless devices 102 and 104. Access nodes 208, 210, and 212 may comprise access nodes similar to access nodes 106 and 108.

In operation, access node 208 may establish communication with wireless device 202 such that access node 208 provides the wireless device access to a communication network (e.g., communication network 110). Similarly, access node 210 may establish communication with wireless device 204 such that access node 210 provides the wireless device access to a communication network (e.g., communication network 110) and access node 212 may establish communication with wireless device 206 such that access node 212 provides the wireless device access to a communication network (e.g., communication network 110).

Controller node 214 can be any network node configured to manage services within system 200. Controller node 214 may provide other control and management functions for system 200. The controller node 214 can be a single device having various functions or a plurality of devices having differing functions. For example, controller node 410 can include at least one of a multi-cell/multicast coordination entity (MCE), a mobility management entity (MME), a radio network controller (RNC), a mobile switching center (MSC), and a combination thereof.

In an embodiment, system 200 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, system 200 may provide Multimedia Broadcast Multicast Services (MBMS). For example, system 200 may employ eMBMS, Multicast-broadcast Single Frequency Network (MBSFN), and any other suitable protocol. Here, access nodes 208, 210, and 212 may comprise a single frequency network (SFN). For example, wireless devices 202, 204, and 206 may subscribe to a broadcast. The broadcast may be transmitted by each access node participating in the broadcast over the same frequency band, resulting in an SFN.

In an embodiment, wireless devices 202, 204 and 206 may not subscribe to the broadcast, but it may be determined that the wireless devices are to receive the broadcast. For example, based on a geographic location (e.g., at a sports stadium), it may be determined that wireless devices 202, 204, and 206 are to receive a particular broadcast (e.g., broadcast associated with a game taking place in the stadium).

In an embodiment, a plurality of broadcast content may be received, and broadcast parameters may be determined for the plurality of broadcast content. For instance, broadcast content such as live news, mobile television, sports streams, advertising, and the like may be received at controller node 214 (e.g., from content providers, not depicted). Broadcast parameters for the plurality of content may then be determined. For example, it may be determined how many of access nodes 202, 204, and 206 are to transmit each broadcast, and what bandwidth will be used to transmit each broadcast. Moreover, the plurality of broadcast content may be scheduled to allow for appropriate transmission of the broadcasts. Accordingly, a system that determines broadcast parameters for a transmission may enhance user experience and efficiently leverage system resources.

Systems and methods are described for determining broadcast parameters for a transmission. A plurality of broadcast content that comprise a priority level may be received, where each of the plurality of broadcast content may also comprise a timing for broadcasting. For each of the plurality of broadcast content, a number of nodes for broadcasting may be determined based on the priority level and the timing for broadcasting. The plurality of broadcast content may also be ranked based on the timing for broadcasting and the number of nodes for broadcasting. At least one scheduler may be instructed to schedule the plurality of content for broadcasting based on the ranking and the priority level for each of the plurality of broadcast content.

Figure 3:
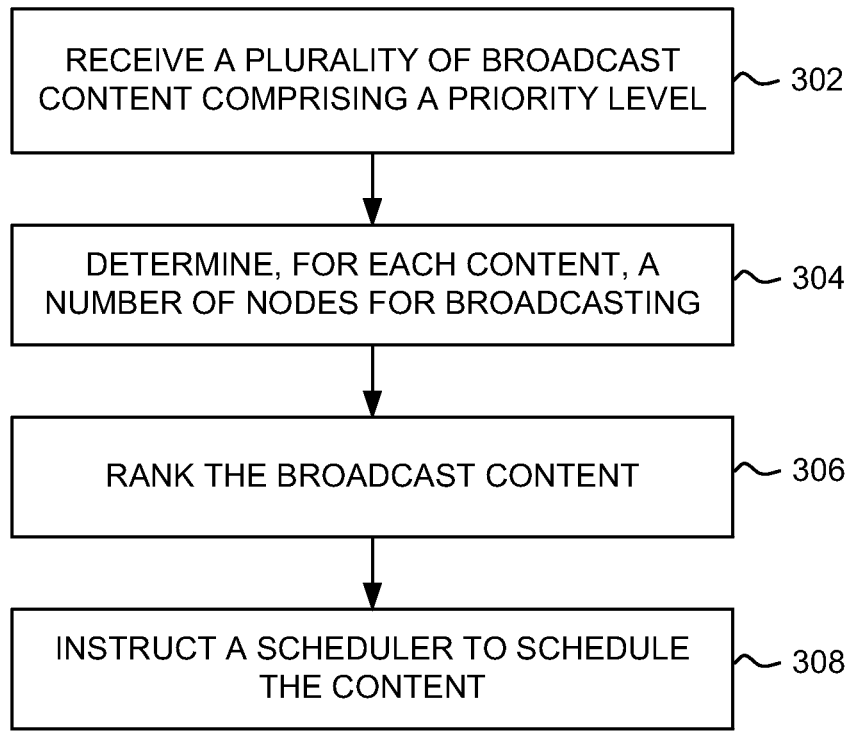
FIG. 3 illustrates an exemplary method of determining a transmission scheme for a broadcast.

FIG. 3 illustrates an exemplary method for determining broadcast parameters for a transmission. The method will be discussed with reference to the exemplary communication system 200 illustrated in FIG. 2, however, the method can be implemented with any suitable communication system.

Referring to FIG. 3, at step 302, a plurality of broadcast content comprising a priority level and a timing for broadcasting may be received. For example, broadcast content, such as live news, mobile television, sports streams, advertising, and the like, may be received at the controller node 214. Each broadcast content may comprise a timing for broadcasting and a priority level for broadcasting. For example, a timing may indicate a time window (e.g., minutes, hours, and the like) for broadcasting or a frequency for broadcasting (e.g., reoccurring broadcasting based on a period, such as an advertisement). A priority level may indicate a network priority for broadcasting. For instance, advertising may comprise a higher priority level than mobile television because advertising may generate revenue for the network. In another example, mobile television may comprise a higher priority than live news because a subscription may be required for mobile television but may not be required for live news, and accordingly mobile television may generate revenue for the network.

At step 304, a number of nodes, for each broadcast content, may be determined for broadcasting. For example, when a first, second, and third broadcast content are received, it may be determined which of access nodes 208, 210, and 212 may be used to broadcast each of the first, second, and third broadcasts. The access nodes for broadcasting may be determined based on one or more of the priority level for each content and the broadcast timing for each content.

At step 306, the plurality of broadcast content may be ranked. For example, a first, second, and third broadcast content may be ranked based on one or more of a timing for broadcasting for each broadcast content, a priority level for each broadcast content, and a number of access nodes for each broadcast content.

At step 308, a scheduler may be instructed to schedule the plurality of content for broadcasting based on the ranking. For example, a scheduler (e.g., at controller node 214) may be instructed to schedule the first, second, and third broadcast content based on the ranking from step 306. In an embodiment, the scheduler may determine one or more of a modulation and coding scheme for the broadcast content, a timing for the broadcast content, a frequency band for the broadcast content, and the like.

Figure 4:
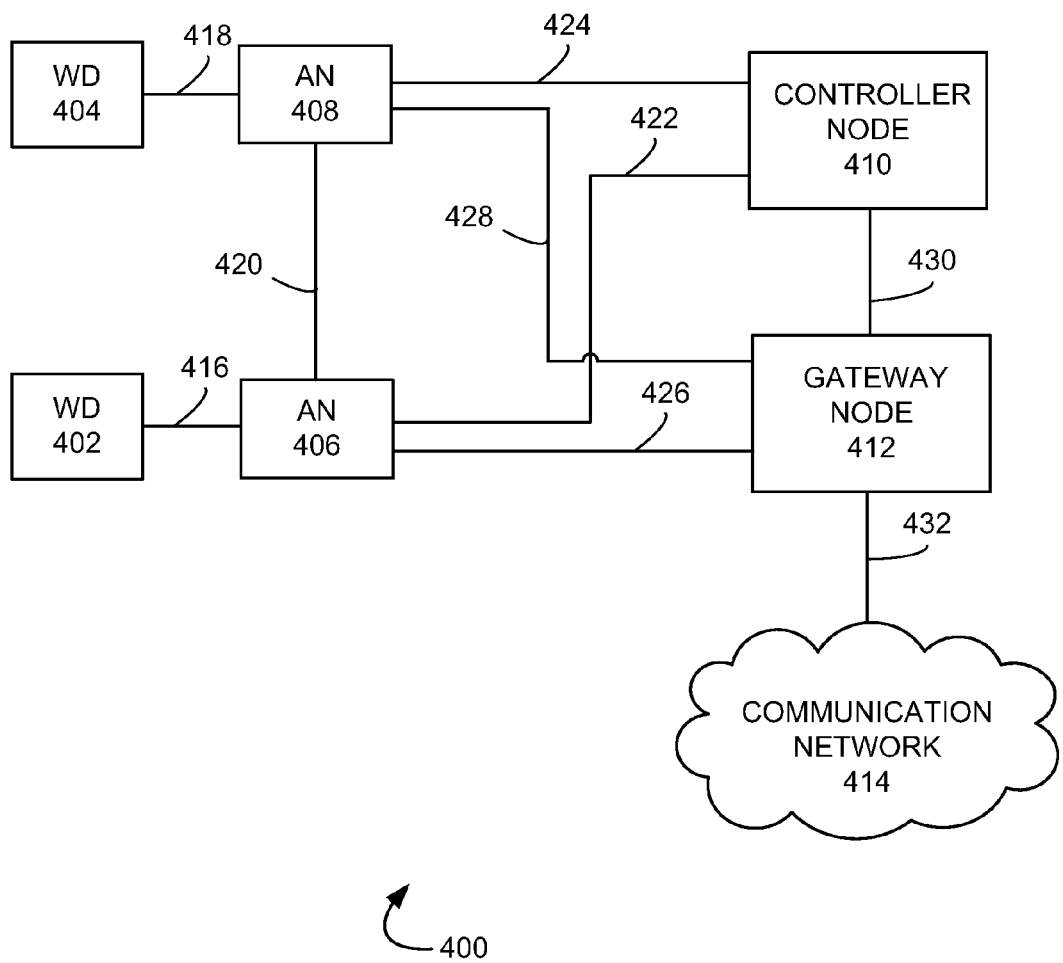
FIG. 4 illustrates another exemplary system to determine a transmission scheme for a broadcast.

FIG. 4 illustrates another exemplary communication system 400 to determine a transmission scheme for a broadcast. Communication system 400 may comprise a wireless devices 402 and 404, access nodes 406 and 408, controller node 410, gateway node 412, communication network 414, and communication links 416, 418, 420, 422, 424, 426, 428, 430, and 432. Other network elements may be present in the communication system 400 to facilitate communication but are omitted for clarity, such as base stations, base station controllers, gateways, mobile switching centers, dispatch application processors, and location registers such as a home location register or visitor location register.

Wireless devices 402 and 404 can be any device configured to communicate over communication system 400 using a wireless communication link. For example, wireless devices 402 and 404 can include a cell phone, a smart phone, a computing platform such as a laptop, palmtop, or a tablet, a personal digital assistant, or an internet access device, and combinations thereof.

Access nodes 406 and 408 are network nodes capable of providing wireless communications to wireless devices 402 and 404, and can be, for example, a base transceiver station, a radio base station, or an eNodeB device. In an embodiment, access nodes 406 can comprise a serving access node for wireless device 402 and access node 408 can comprise a serving access node for wireless device 404. Access nodes 406 and 408 may communicate with controller node 410 over communication links 422 and 424, respectively, and with gateway node 412 over communication links 426 and 428, respectively. Access nodes 406 and 408 may also communicate directly with each other over communication link 420.

Controller node 410 can be any network node configured to manage services within system 400. Controller node 410 may provide other control and management functions for system 400. The controller node 410 can be a single device having various functions or a plurality of devices having differing functions. For example, controller node 410 can include at least one of a multi-cell/multicast coordination entity (MCE), a mobility management entity (MME), a radio network controller (RNC), a mobile switching center (MSC), and a combination thereof.

Controller node 410 can comprise a processor and associated circuitry to execute or direct the execution of computer-readable instructions to obtain information. Controller node 410 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 410 can receive instructions and other input at a user interface. Controller node 410 can comprise a processor and associated circuitry to execute or direct the execution of computer-readable instructions to obtain information.

Gateway node 412 is a network element which can comprise a processor and associated circuitry to execute or direct the execution of computer-readable instructions. Gateway node 412 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 412 can provide instructions to access nodes 406 and 408 related to channel selection in communications with wireless devices 402 and 404. For example, gateway node 412 can comprise at least one of a serving gateway (SGW), a packet data network gateway (PDNGW), a cellular gateway (CGW), and a combination thereof.

Communication network 414 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 414 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 414 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 416, 418, 420, 422, 424, 426, 428, 430, and 432 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 406 and 408, controller node 410, gateway node 412, and communication network 414 which are omitted for clarity, including additional processing nodes, routers, gateways, and physical and/or wireless data links for carrying data among the various network elements.

Figure 6:
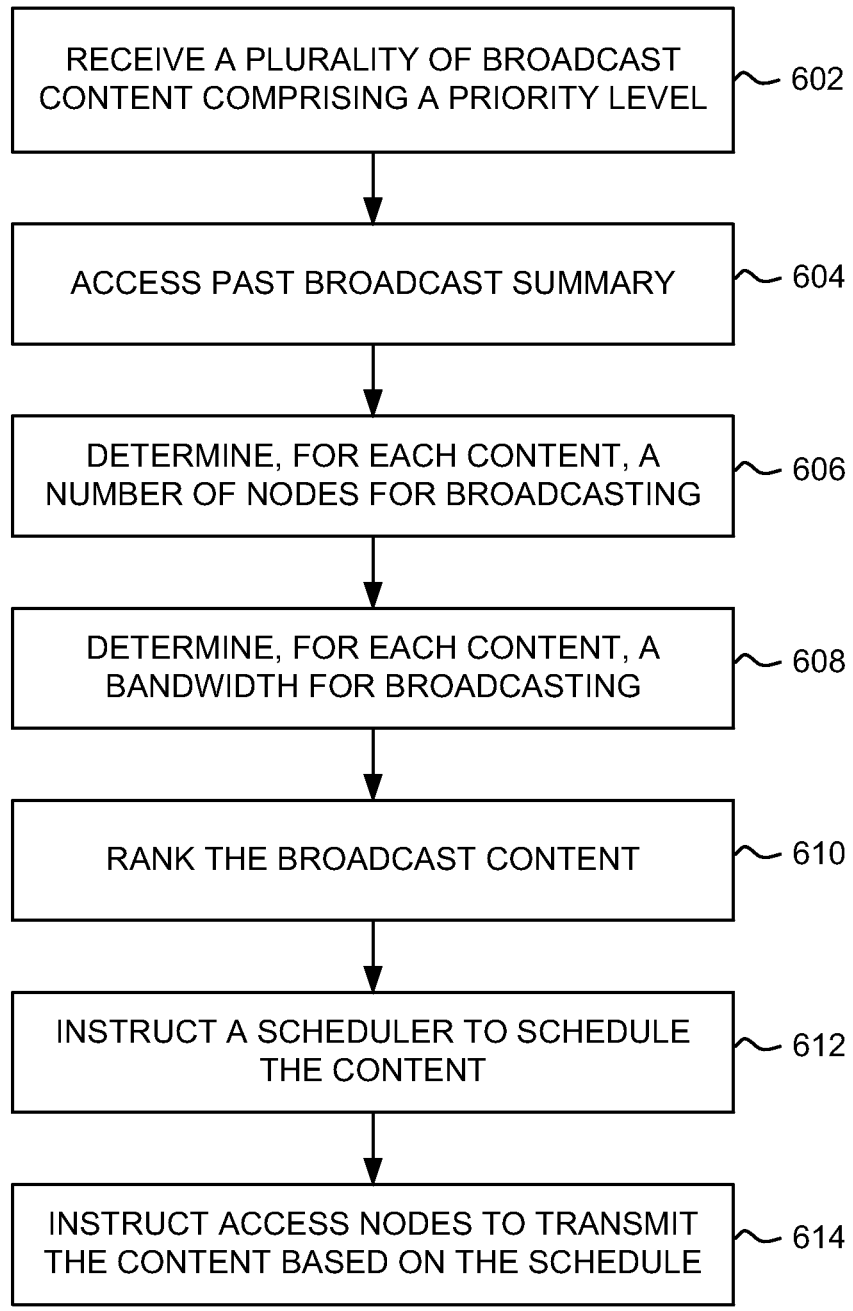
FIG. 6 illustrates another exemplary method of determining a transmission scheme for a broadcast.

In an embodiment, any of controller node 410, gateway node 412, and one or more modules of access nodes 406 and/or 408 may perform all or parts of the methods of FIGS. 3 and 6.

Figure 5:
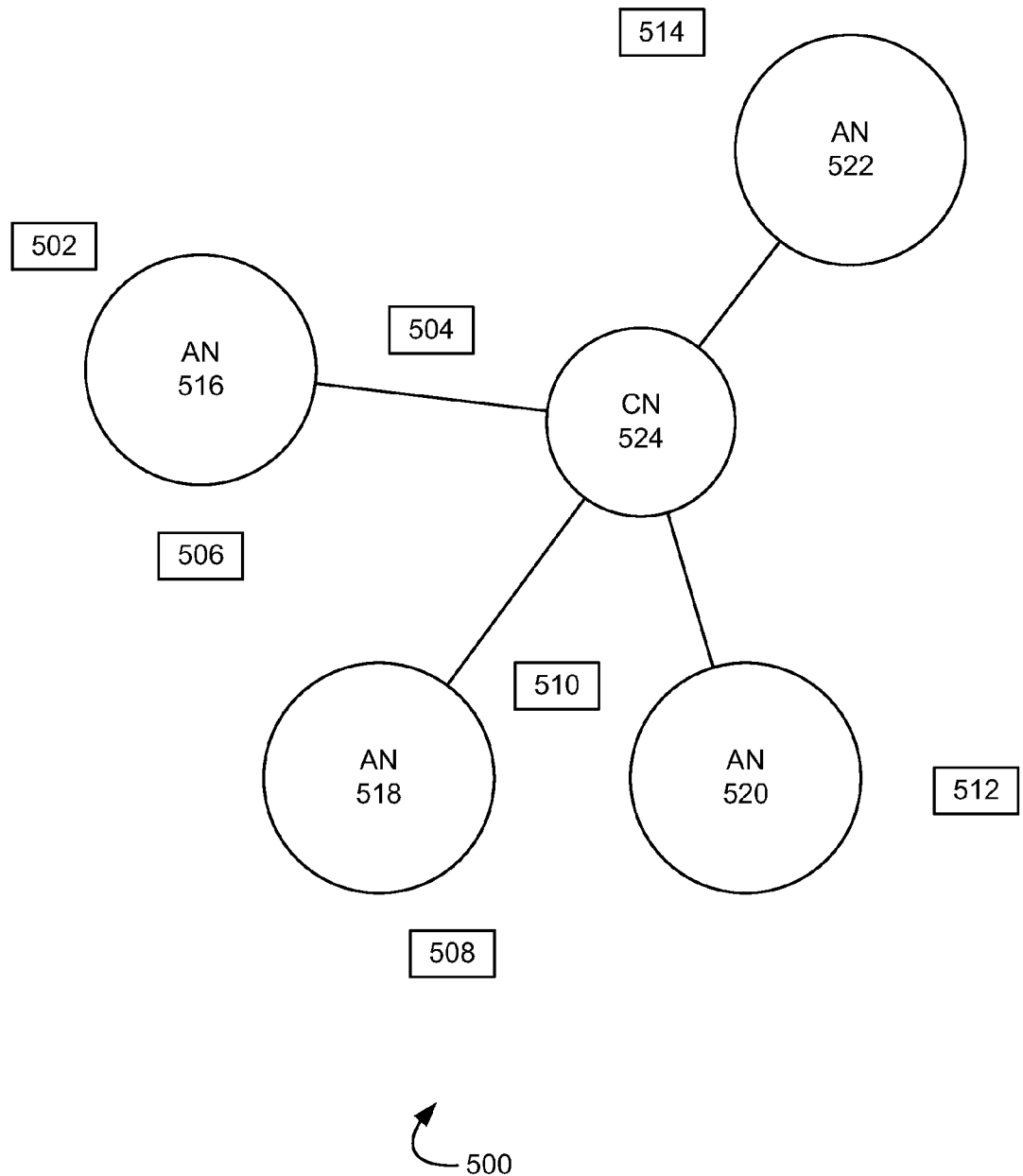
FIG. 5 illustrates another exemplary system to determine a transmission scheme for a broadcast.

FIG. 5 illustrates an exemplary communication system 500 for determining broadcast parameters for a transmission. System 500 comprises wireless devices 502, 504, 506, 508, 510, 512, and 514, access nodes 516, 518, 520, and 522, and controller node 524. Wireless devices 502, 504, 506, 508, 510, 512, and 514 may comprise devices similar to wireless devices 402 and 404. Access nodes 516, 518, 520, and 522 may comprise access nodes similar to access nodes 406 and 408. Controller node 524 may comprise a controller node similar to controller node 410.

In operation, access node 516 may establish communication with wireless devices 502, 504 and 506 such that access node 516 provides the wireless devices access to a communication network (e.g., communication network 414). Similarly, access node 518 may establish communication with wireless devices 508 and 510 such that access node 518 provides the wireless devices access to a communication network (e.g., communication network 414), access node 520 may establish communication with wireless device 512 such that access node 520 provides the wireless device access to a communication network (e.g., communication network 414), and access node 522 may establish communication with wireless device 515 such that access node 522 provides the wireless device access to a communication network.

In an embodiment, system 500 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, system 500 may provide Multimedia Broadcast Multicast Services (MBMS). For example, system 500 may employ eMBMS, Multicast-broadcast Single Frequency Network (MBSFN), and any other suitable protocol. Here, access nodes 516, 518, and 520 may comprise a single frequency network (SFN). For example, wireless devices 502, 504, 508, and 512 may subscribe to a broadcast. The broadcast may be transmitted by each access node participating in the broadcast over the same frequency band, resulting in an SFN.

In an embodiment, wireless devices 502, 504, 508, and 512 may not subscribe to the broadcast, but it may be determined that the wireless devices are to receive the broadcast. For example, based on a geographic location (e.g., at a sports stadium), it may be determined that wireless devices 502, 504, 506, 508, 510, and 512 are to receive a particular broadcast (e.g., broadcast associated with a game taking place in the stadium).

In an embodiment, a plurality of broadcast content may be received, and broadcast parameters may be determined for the plurality of broadcast content. For instance, broadcast content such as live news, mobile television, sports streams, advertising, and the like may be received at controller node 524 (e.g., from content providers, not depicted). Broadcast parameters for the plurality of content may then be determined. For example, it may be determined how many of access nodes 516, 518, 520, and 522 are to transmit each broadcast, and what bandwidth will be used to transmit each broadcast. Moreover, the plurality of broadcast content may be scheduled to allow for appropriate transmission of the broadcasts. Accordingly, a system that determines broadcast parameters for a transmission may enhance user experience and efficiently leverage system resources.

FIG. 6 illustrates an exemplary method for determining a transmission scheme for a broadcast. The method will be discussed with reference to the exemplary communication system 500 illustrated in FIG. 5, however, the method can be implemented with any suitable communication system.

Referring to FIG. 6, at step 602, a plurality of broadcast content comprising a priority level and a timing for broadcasting may be received. For example, broadcast content, such as live news, mobile television, sports streams, advertising, and the like, may be received at the controller node 524. Each broadcast content may comprise a timing for broadcasting and a priority level for broadcasting. For example, a timing may indicate a time window (e.g., minutes, hours, and the like) for broadcasting or a frequency for broadcasting (e.g., reoccurring broadcasting based on a period, such as an advertisement). A priority level may indicate a network priority for broadcasting. For instance, advertising may comprise a higher priority level than mobile television because advertising may generate revenue for the network. In another example, mobile television may comprise a higher priority than live news because a subscription may be required for mobile television but may not be required for live news, and accordingly mobile television may generate revenue for the network.

In an embodiment, one or more of the plurality of broadcast content may comprise a broadcast area. For example, where a broadcast comprises a sports related broadcast, the broadcast area may comprise a sports stadium. In other examples, a broadcast area may comprise a building, a city block, a city, a number of miles (e.g., square miles), a geographic region, or any other suitable broadcast area.

At step 604, a past broadcast summary that indicates resources used for a past broadcast may be accessed. For example, one or more previous broadcasts may be performed, and a summary may be stored about the one or more previous broadcasts. The past broadcast summary may include one or more of a number of access nodes used for a past broadcast, a particular access nodes used for a past broadcast, a bandwidth used for a past broadcast, a broadcast area for a past broadcast, a number of wireless devices that received a past broadcast (e.g., number of subscribed wireless devices), a timing for a past broadcast, a content type for a past broadcast (e.g., advertisement, television stream, audio stream, sports stream, and the like), a priority of the content for the past broadcast, quality feedback from wireless devices the received a past broadcast (e.g., retransmission requests, such as ARQ or HARQ, reported channel quality indicators (CQI), bit error rates, and the like), user experience feedback from wireless devices that received the past broadcast (e.g., user satisfaction levels, user responses indicative of the quality of the broadcast, and the like), a modulation and coding scheme for a past broadcast, a bit rate (e.g., indicate of redundant bits) for a past broadcast, and other suitable parameters for a past broadcast. In an embodiment, a plurality of past broadcast summaries may be accessed. Additionally, a past broadcast summary may comprise parameters for a plurality of past broadcasts.

At step 606, a number of nodes for each broadcast content may be determined for broadcasting. For example, when a first, second, and third broadcast content are received, it may be determined which of access nodes 516, 518, 520, and 522 may be used to broadcast each of the first, second, and third broadcasts. The access nodes for broadcasting may be determined based on one or more of the priority level for each content and the broadcast timing for each content.

In an embodiment, a number of access nodes for at least one of the plurality of broadcast content may be determined based on a broadcast area for the broadcast content. For example, at least one of the broadcast content may comprise a broadcast area (e.g., a sports stadium) and the number of nodes determined for broadcasting may be based on the broadcast area. In an embodiment, a number of access nodes for at least one of the plurality of broadcast content may be determined based on a user importance level for the broadcast content. For example, users of wireless devices in the broadcast area may comprise a user importance level for the broadcast content (e.g., based on user feedback, other reported user information, or the like) and a number of access nodes for broadcasting may be determined based on the user importance level for the broadcast content.

In an embodiment, a number of access nodes for at least one of the plurality of broadcast content may be determined based on a past broadcast summary. For example, a past broadcast summary may be accessed and a number of nodes for at least one of the plurality of broadcast content may be determined based on the accessed past broadcast summary. In an embodiment, a first content may comprise a particular type of content (e.g., sports stream), and the number of nodes determined for broadcasting the first content may be based on one or more past broadcast summaries that comprise parameters for previous broadcasts of that type (e.g., past sports streams). In another example, a first content may comprise a timing for broadcasting, and the number of nodes determined for broadcasting the first content may be based on one or more past broadcast summaries that comprise parameters for previous broadcasts of that timing (e.g., hour of the day, day of the week, frequency, and the like). In an embodiment, a first content may comprise a broadcast area, and the number of nodes determined for broadcasting the first content may be based on one or more past broadcast summaries that comprise parameters for previous broadcasts of that broadcast area.

At step 608, a bandwidth, for each broadcast content, may be determined for broadcasting. For example, when a first, second, and third broadcast content are received, it may be determined what bandwidth may be used to broadcast each of the first, second, and third broadcasts. The bandwidth for broadcasting may be determined based on one or more of the priority level for each content and the broadcast timing for each content.

In an embodiment, a bandwidth for at least one of the plurality of broadcast content may be determined based on a broadcast area for the broadcast content. For example, at least one of the broadcast content may comprise a broadcast area (e.g., a sports stadium) and the bandwidth for broadcasting may be based on the broadcast area. In an embodiment, a bandwidth for at least one of the plurality of broadcast content may be determined based on a user importance level for the broadcast content. For example, users of wireless devices in the broadcast area may comprise a user importance level for the broadcast content (e.g., based on user feedback, other reported user information, or the like) and a bandwidth for broadcasting may be determined based on the user importance level for the broadcast content.

In an embodiment, a bandwidth for at least one of the plurality of broadcast content may be determined based on a past broadcast summary. For example, a past broadcast summary may be accessed and a bandwidth for at least one of the plurality of broadcast content may be determined based on the accessed past broadcast summary. In an embodiment, a first content may comprise a particular type of content (e.g., sports stream), and the bandwidth determined for broadcasting the first content may be based on one or more past broadcast summaries that comprise parameters for previous broadcasts of that type (e.g., past sports streams). In another example, a first content may comprise a timing for broadcasting, and the bandwidth determined for broadcasting the first content may be based on one or more past broadcast summaries that comprise parameters for previous broadcasts of that timing (e.g., hour of the day, day of the week, frequency, and the like). In an embodiment, a first content may comprise a broadcast area, and the bandwidth determined for broadcasting the first content may be based on one or more past broadcast summaries that comprise parameters for previous broadcasts of that broadcast area.

At step 610, the plurality of broadcast content may be ranked. For example, a first, second, and third broadcast content may be ranked based on one or more of a timing for broadcasting for each broadcast content and a number of access nodes for each broadcast content.

In an embodiment, the ranking may be based on a timing for broadcasting for each broadcast content, a number of access nodes for each broadcast content, and a priority for each broadcast content. For example, each broadcast content may comprise a timing for broadcasting and a priority level. Additionally, a number of access nodes may be determined for broadcasting for each broadcast content. The broadcast content may then be ranked based on the timing for broadcasting, the priority for each broadcast content, and the determined number of access nodes for each broadcast content.

In an embodiment, the ranking may be based on a timing for broadcasting for each broadcast content, a number of access nodes for each broadcast content, and a bandwidth for each broadcast content. For example, each broadcast content may comprise a timing for broadcasting. Additionally, a number of access nodes may be determined for broadcasting for each broadcast content and a bandwidth may be determined for broadcasting for each broadcast content. The broadcast content may then be ranked based on the timing for broadcasting, the determined number of access nodes for each broadcast content, and the determined bandwidth for each broadcast content.

In an embodiment, the ranking may be based on a timing for broadcasting for each broadcast content, a number of access nodes for each broadcast content, and a broadcast area for each broadcast content. For example, each broadcast content may comprise a timing for broadcasting and a broadcast area (e.g., an geographic area for broadcasting the broadcast content). Additionally, a number of access nodes may be determined for broadcasting for each broadcast content. The broadcast content may then be ranked based on the timing for broadcasting, the broadcast area, and the determined number of access nodes for each broadcast content.

In an embodiment, the ranking may be based on a timing for broadcasting for each broadcast content, a number of access nodes for each broadcast content, and user importance levels for each broadcast content. For example, each broadcast content may comprise a timing for broadcasting. Additionally, a number of access nodes may be determined for broadcasting for each broadcast content. Further, a user importance level for users of wireless devices (e.g., wireless devices located in the broadcast area) may be determined for each broadcast content. For example, the user importance level may be determined by user feedback, for instance feedback from previous broadcasts of similar content (e.g., previous broadcasts comprising the same type of content), from a user profile that comprises user preferences, and the like. The broadcast content may then be ranked based on the timing for broadcasting, the determined number of access nodes for each broadcast content, and the user importance levels. In an embodiment, the ranking may be based on any combination of the timing for broadcasting, the priority for each broadcast content, the broadcast area for each broadcast content, the determined number of access nodes for each broadcast content, the determined bandwidth for each broadcast content, the broadcast area for each broadcast content, and the user importance levels for each broadcast content.

In an embodiment, the ranking may be based on an algorithm. For example, each content may be ranked basted on a Content Priority Index (CPI) for content i over broadcast location L, or $CPI_{L,i}$. CPI may be based on a particular window of time, such as minutes, hours, days, and the like, for broadcasting (T), a priority level for content ($P_i$), the wireless device users in location L (M), the access nodes in location L (N), content type (Q), and a quality level for user in location L (QL). A content type may comprise a type of content (e.g., advertisement, television stream, audio stream, sports stream, and the like). A quality level may comprise a quality level relative to the wireless devices in location L determined by feedback, estimation, and the like. For example, a sports related broadcast associated with a game being played at a stadium may comprise a quality level for the wireless devices located in the stadium that is a higher than a quality level for a mobile television broadcast for the same location. In addition, $QL_{k,s,i}$ may denote the quality level for wireless device k covered by access node s for broadcast content i.

In an embodiment, the CPI algorithm may comprise:

$$CPI_{L,i} = \frac{\sum_{t=1}^{T}\left[P_i \cdot \left(\sum_{s=1}^{N}\sum_{k=1}^{M} QL_{k,s,i}\right)\right] \cdot I_{t+dt}}{\sum_{t=1}^{T}\left\{\sum_{i=1}^{Q}\left[P_i \cdot \left(\sum_{s=1}^{N}\sum_{k=1}^{M} QL_{k,s,i}\right)\right]\right\} \cdot I_{t+dt}}$$

Accordingly, in an embodiment, for content (i) relative to location (L), CPI may be based on a combination of a window of time for broadcasting (T), a priority level for content ($P_i$), wireless devices (and wireless devices users) in location L (M), access nodes in location L (N), content type (Q), and a quality level for user in location L (QL).

In an embodiment, a CPI may be calculated for each of the plurality of broadcast content, and the content may be ranked according to the calculated CPI. For example, the content may be ranked according to the highest calculated CPI. In an embodiment, the CPI, calculated for each content may be weighted by the priority level P, for the content. The content may then be ranked by the weighted CPI, for instance, according to the highest weighted CPI. In other embodiments, the content may be ranked according to lowest CPI, lowest weighted CPI, and any other suitable metric.

At step 612, a scheduler may be instructed to schedule the plurality of content for broadcasting based on the ranking. For example, a scheduler (e.g., at controller node 524) may be instructed to schedule the first, second, and third broadcast content based on the ranking from step 610. In an embodiment, the scheduler may determine one or more of a modulation and coding scheme for the broadcast content, a timing for the broadcast content, a frequency band for the broadcast content, and the like.

In an embodiment, the scheduler may schedule the plurality of broadcast content based on the ranking. For example, the scheduler may schedule the broadcast content with the highest CPI (or the highest weighted CPI) for broadcasting, and then next scheduled the content with the next highest CPI (or the next highest weighted CPI) for broadcasting. The scheduled may then instruct access nodes to broadcast the content according to the schedule. For example, a scheduler (e.g., at controller node 524) may instruct one or more of access nodes 516, 518, 520, and 522 to broadcast the content according to the schedule. Accordingly, one or more of access nodes 516, 518, 520, and 522 may broadcast the broadcast content according to the schedule and determined parameters (e.g., using the determined access nodes, bandwidth, broadcast area, timing, and the like).

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 7:
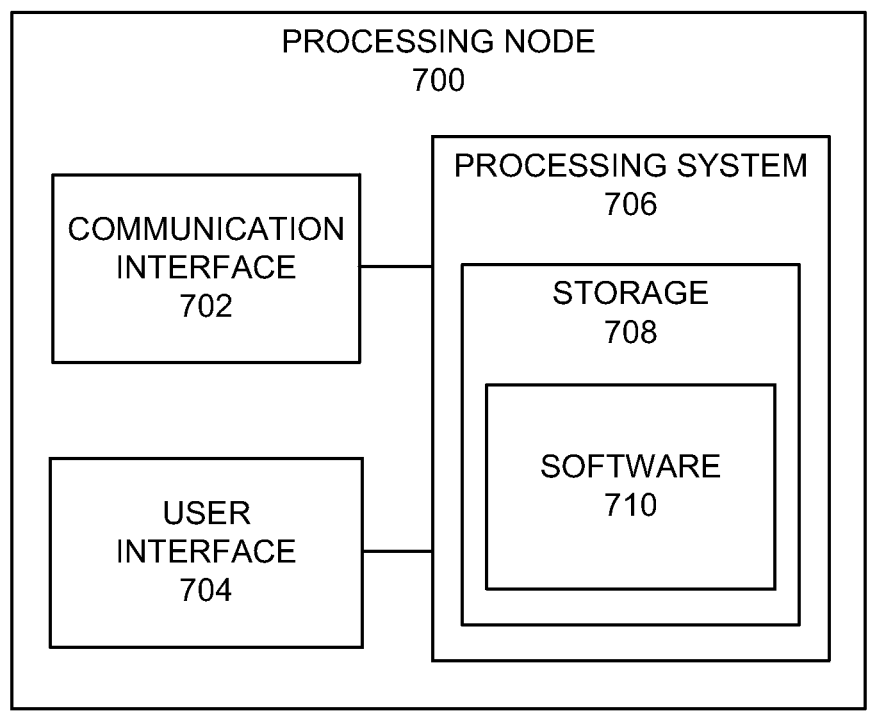
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to determine a communication access node for a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include controller node 410 and gateway node 412. Processing node 700 can also be an adjunct or component of a network element, such as an element of access nodes 106 or 406 and the like. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for determining broadcast parameters for a transmission, the method comprising:
    receiving a plurality of broadcast content comprising a priority level and a timing for broadcasting;
    accessing a past broadcast summary that indicates past resources used to previously broadcast content and quality feedback from wireless devices that received the previously broadcasted content, wherein the quality feedback comprises retransmission requests from the wireless devices that received the previously broadcasted content;
    determining, for each of the plurality of broadcast content, a number of access nodes for broadcasting based on the priority level, the timing for broadcasting, and the accessed past broadcast summary;
    ranking the plurality of broadcast content based on the timing for broadcasting and the number of access nodes for broadcasting;
    instructing at least one scheduler to schedule the plurality of content for broadcasting based on the ranking for each of the plurality of broadcast content.

2. The method of claim 1, further comprising:
    instructing, by the scheduler, a plurality of access nodes to broadcast the plurality of broadcast content based on the schedule.

3. The method of claim 1, further comprising:
    instructing at least one scheduler to schedule the plurality of content for broadcasting based on the ranking and the past broadcast summary.

4. The method of claim 1, further comprising:
    determining, for each of the plurality of broadcast content, a bandwidth for broadcasting based on the priority level and the timing for broadcasting; and
    ranking the plurality of broadcast content based on the timing for broadcasting, the number of access nodes for broadcasting, and the bandwidth for broadcasting.

5. The method of claim 4, wherein determining for the at least one broadcast content a bandwidth for broadcasting is further based on the past broadcast summary.

6. The method of claim 4, wherein each of the plurality of broadcast content further comprise a broadcast area.

7. The method of claim 6, further comprising:
    determining, for each of the plurality of broadcast content, a number of access nodes for broadcasting based on the priority level, the timing for broadcasting, the accessed past broadcast summary, and the broadcast area; and
    determining, for each of the plurality of broadcast content, a bandwidth for broadcasting based on the priority level, the timing for broadcasting, and the broadcast area; and
    ranking the plurality of broadcast content based on the timing for broadcasting, the number of access nodes for broadcasting, the bandwidth for broadcasting, and the broadcast area.

8. The method of claim 6, further comprising:
    determining, for each of the plurality of broadcast content, a number of access nodes for broadcasting based on the priority level, the timing for broadcasting, the accessed past broadcast summary, and the user importance levels; and
    determining, for each of the plurality of broadcast content, a bandwidth for broadcasting based on the priority level, the timing for broadcasting, and the user importance levels; and
    ranking the plurality of broadcast content based on the timing for broadcasting, the number of access nodes for broadcasting, the bandwidth for broadcasting, and the user importance levels.

9. The method of claim 4, wherein each of the plurality of broadcast content further comprise user importance levels that indicate the importance of the broadcast to users of wireless devices.

10. The method of claim 1, wherein quality feedback further comprises bit error rates from wireless devices that received the previously broadcasted content.

11. The method of claim 1, wherein a number of access nodes for a particular broadcast content that comprises a particular broadcast area is determined based on resources used for past broadcasts over the particular broadcast area as indicated by the past broadcast summary.

12. A system for determining broadcast parameters for a transmission, the system comprising:
    a processing node with a processor configured to:
    receive a plurality of broadcast content comprising a priority level and a timing for broadcasting;
    access a past broadcast summary that indicates past resources used to previously broadcast content and quality feedback from wireless devices that received the previously broadcasted content, wherein the quality feedback comprises retransmission requests from the wireless devices that received the previously broadcasted content;
    determine, for each of the plurality of broadcast content, a number of access nodes for broadcasting based on the priority level, the timing for broadcasting, and the accessed past broadcast summary;
    rank the plurality of broadcast content based on the timing for broadcasting and the number of access nodes for broadcasting;
    instruct at least one scheduler to schedule the plurality of content for broadcasting based on the ranking for each of the plurality of broadcast content.

13. The system of claim 12, wherein the scheduler is configured to instruct a plurality of access nodes to broadcast the plurality of broadcast content based on the schedule.

14. The system of claim 12, wherein the processing node is further configured to:

instruct at least one scheduler to schedule the plurality of content for broadcasting based on the ranking and the past broadcast summary.

15. The system of claim 12, wherein the processing node is further configured to:
   determine, for each of the plurality of broadcast content, a bandwidth for broadcasting based on the priority level and the timing for broadcasting; and
   rank the plurality of broadcast content based on the timing for broadcasting, the number of access nodes for broadcasting, and the bandwidth for broadcasting.

16. The system of claim 15, wherein determining for the at least one broadcast content a bandwidth for broadcasting is further based on the past broadcast summary.

17. The system of claim 15, wherein each of the plurality of broadcast content further comprises a broadcast area.

18. The system of claim 17, wherein the processing node is further configured to:
   determine, for each of the plurality of broadcast content, a number of access nodes for broadcasting based on the priority level, the timing for broadcasting, the accessed past broadcast summary, and the broadcast area; and
   determine, for each of the plurality of broadcast content, a bandwidth for broadcasting based on the priority level, the timing for broadcasting, and the broadcast area; and
   rank the plurality of broadcast content based on the timing for broadcasting, the number of access nodes for broadcasting, the bandwidth for broadcasting, and the broadcast area.

19. The system of claim 12, wherein quality feedback further comprises bit error rates from wireless devices that received the previously broadcasted content.

20. The system of claim 12, wherein a number of access nodes for a particular broadcast content that comprises a particular broadcast area is determined based on resources used for past broadcasts over the particular broadcast area as indicated by the past broadcast summary.

* * * * *